United States Patent
Chang

(10) Patent No.: US 8,796,056 B2
(45) Date of Patent: Aug. 5, 2014

(54) METHOD FOR FABRICATING A DISPLAY PANEL

(71) Applicant: AU Optronics Corp., Hsin-Chu (TW)

(72) Inventor: Chi-Ho Chang, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 4 days.

(21) Appl. No.: 13/831,974

(22) Filed: Mar. 15, 2013

(65) Prior Publication Data

US 2014/0087503 A1 Mar. 27, 2014

(30) Foreign Application Priority Data

Sep. 26, 2012 (TW) .............................. 101135316 A

(51) Int. Cl.
*H01L 21/00* (2006.01)

(52) U.S. Cl.
USPC .............. 438/30; 257/E21.122; 257/E21.567; 438/22; 438/29; 438/455; 438/458

(58) Field of Classification Search
USPC ......... 257/E21.122, E21.567; 438/22, 29, 30, 438/455, 458
See application file for complete search history.

(56) References Cited

U.S. PATENT DOCUMENTS

| | | | |
|---|---|---|---|
| 2003/0032210 A1* | 2/2003 | Takayama et al. | 438/30 |
| 2007/0181246 A1* | 8/2007 | Yamashita et al. | 156/235 |
| 2008/0142825 A1* | 6/2008 | Chen et al. | 257/98 |
| 2010/0210055 A1* | 8/2010 | Yoon et al. | 438/30 |

FOREIGN PATENT DOCUMENTS

| | | |
|---|---|---|
| TW | M350725 | 2/2009 |
| TW | 201020870 | 6/2010 |

* cited by examiner

*Primary Examiner* — Asok K Sarkar
(74) *Attorney, Agent, or Firm* — Winston Hsu; Scott Margo

(57) ABSTRACT

A method for fabricating a display panel includes the following steps. A surface of a first substrate is adhered to a first supporting substrate with a first adhesive layer. First devices are formed on the other surface of the first substrate. The other surface of the first substrate is adhered to a second supporting substrate with a second adhesive layer. The first adhesive layer and supporting substrate are separated from the first substrate. Second devices are formed on the surface of the first substrate. A second substrate is adhered to a third supporting substrate with a third adhesive layer. The first substrate and the second substrate are assembled, and a display medium layer is interposed between the first substrate and the second substrate. The second adhesive layer and supporting substrate are separated from the first substrate, and the third adhesive layer and supporting substrate are separated from the second substrate.

12 Claims, 10 Drawing Sheets

METHOD FOR FABRICATING A DISPLAY PANEL

BACKGROUND OF THE INVENTION

1. Field of the Invention

The present invention relates to a method for fabricating a display panel, and particularly to a method for fabricating a display panel, in which method a substrate can be prevented from breaking.

2. Description of the Prior Art

Touch input is one of important developments in current display technology. In order to impart a touch input function to a display panel, the touch panel and the display panel are integrated together. Besides, touch devices may be formed on substrates of display panels, in order to reduce overall thickness of the touch display panel and increase the transmission rate. Such touch display panel is generally referred to as "on-cell touch display panel". For making an on-cell touch liquid crystal display panel, for example, color filters are formed on a surface of the substrate in advance, and thereafter touch devices are formed on another surface of the substrate. However, the color filters already formed on the substrate tend to be damaged during the formation of touch devices, leading to a poor yield. Besides, the substrate, such as glass substrate, must has a thickness of 0.4 millimeters (mm) or greater, for avoiding breaking. Since there are devices on both surfaces of the substrate, it is not allowed for the substrate to be thinned by a subsequent thinning process to meet a demand for a thin type display panel. Furthermore, if the substrate is warped during the double-side fabricating process, the substrate will tend to break or mal-alignment will tend to occur.

SUMMARY OF THE INVENTION

One objective of the present invention is to provide a method for fabricating a display panel.

A method for fabricating a display panel according to an exemplary embodiment is provided and includes steps as follows. A first substrate is provided. The first substrate has a first surface and a second surface. The first surface and the second surface oppose each other. The second surface of the first substrate is bonded to a first supporting substrate with a first adhesive layer. A plurality of first devices are formed on the first surface of the first substrate. The first surface of the first substrate is bonded to a second supporting substrate with a second adhesive layer. The first adhesive layer and the first supporting substrate are separated from the second surface of the first substrate. A plurality of second devices are formed on the second surface of the first substrate. A second substrate is provided. The second substrate has a third surface and a fourth surface. The third surface and the fourth surface oppose each other. The fourth surface of the second substrate is adhered to a third supporting substrate with a third adhesive layer. The first substrate and the second substrate are assembled, and a display medium layer is formed between the first substrate and the second substrate. The second surface of the first substrate faces the third surface of the second substrate. The second adhesive layer and the second supporting substrate are separated from the first surface of the first substrate, and the third adhesive layer and the third supporting substrate are separated from the fourth surface of the second substrate.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the disclosure to the skilled person in the technical field of the disclosure, exemplary embodiments will be detailed as follows. The exemplary embodiments of the disclosure are illustrated in the accompanying drawings with numbered elements to elaborate the contents and effects to be achieved.

Figure 1:
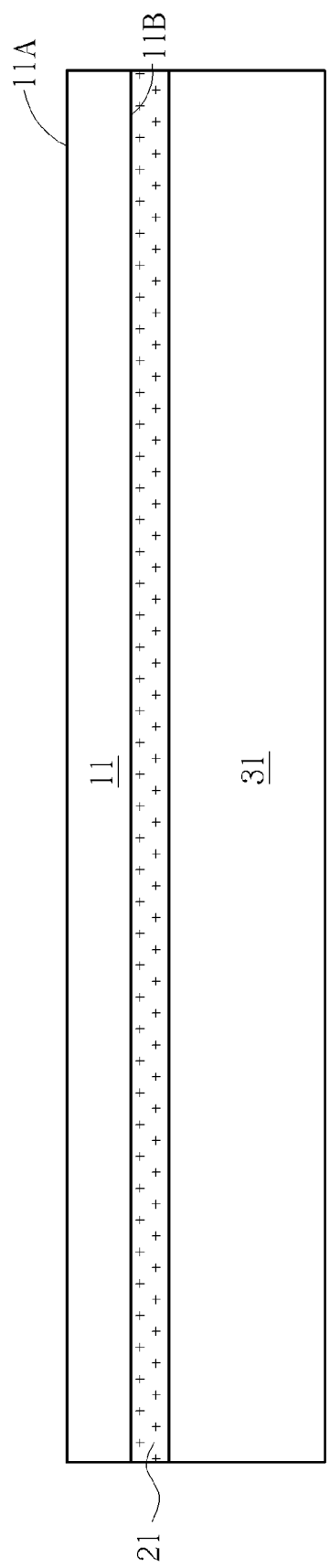
FIGS. 1 to 10 are schematic diagrams illustrating a method for fabricating a display panel according to an embodiment.
Figure 2:
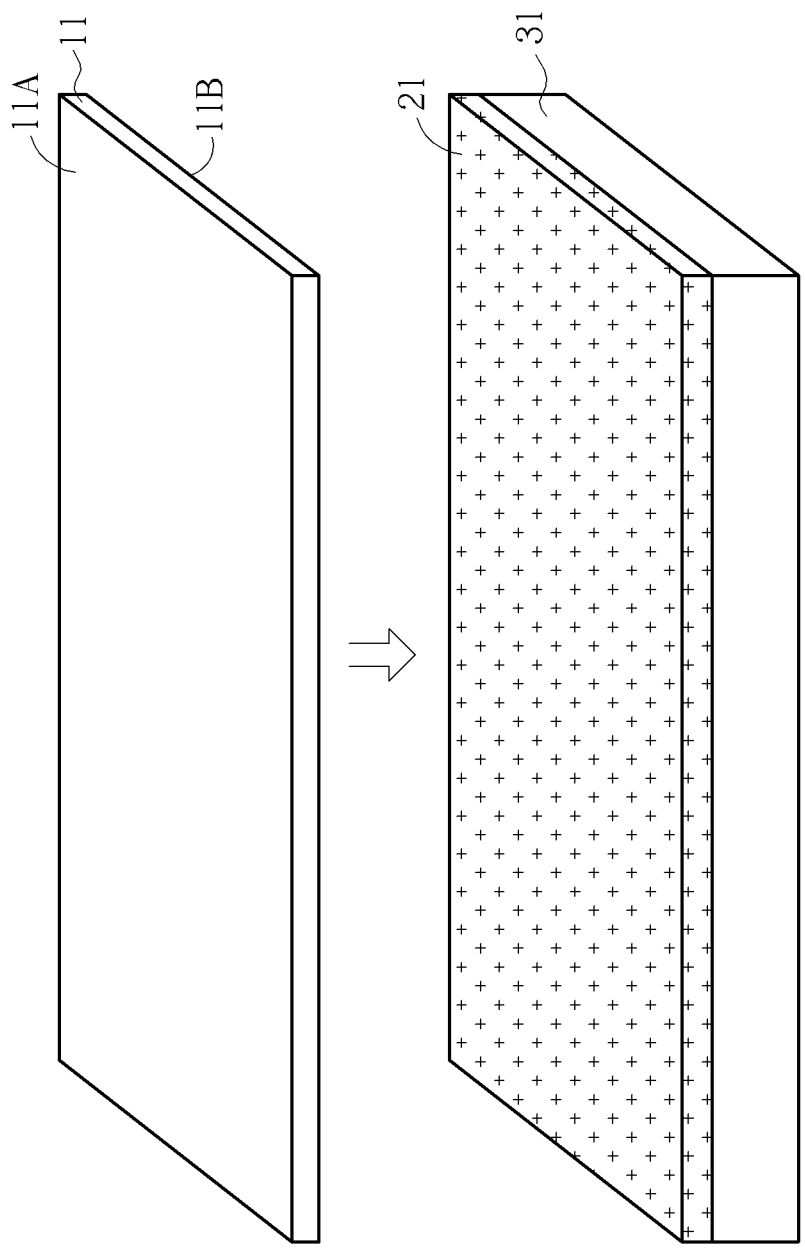

Please refer to FIGS. 1-10, which are schematic diagrams illustrating a method for fabricating a display panel according to an embodiment of the present invention. FIGS. 1 and 3-10 are schematic cross-sectional views. FIG. 2 is a schematic perspective diagram. This embodiment relates to a method for fabricating a non-self-luminescent display panel, but the scope of the present invention is not limited thereto and may encompass a method of fabricating a self-luminescent display panel. Non-self-luminescent display panels may include, for example, a liquid crystal display (LCD) panels, such as horizontally driven LCD panels, vertically driven LCD panel, optically compensated bend (OCB) LCD panels, cholesteric LCD panels, blue phase LCD panels, electrophoretic display panels, electrowetting display panels (EWD), or other suitable display panels. Self-luminescent display panels may include, for example, organic electro-luminescence panels, plasma display panels, field emission display panels, or other suitable panels.

As shown in FIG. 1, a first substrate 11 is provided. The first substrate 11 has a first surface 11A and a second surface 11B opposing each other. In this embodiment, it may be preferred that the first substrate 11 is a glass substrate, and that the thickness of the first substrate 11 is substantially in a range of from 0.05 mm to 0.2 mm, but the scope of the present invention is not limited thereto. Alternatively, the first substrate 11 may be a transparent or non-transparent substrate made of other materials. The thickness may be varied in accordance with the process limitations with respect to different materials. Thereafter, the second surface 11B of the first substrate 11 is adhered to the first supporting substrate 31 with the first adhesive layer 21. The first supporting substrate 31 supports the first substrate 11 during the fabricating process and provides functions of buffering and protection for preventing the first substrate 11 from being damaged or breaking or warping during moving. It is preferred that the thickness of the first supporting substrate 31 is greater than that of the first substrate 11. The thickness may be varied in accordance with different material. For example, the first supporting substrate 31 may be preferably a glass substrate and has a thickness of substantially 0.5 mm, but it is not limited thereto.

It is preferred that the first adhesive layer 21 in the embodiment is a whole layer of an adhesive layer, and not just with a frame pattern as a sealant disposed on the peripheral portion of the first supporting substrate 31. The way to bond the first substrate 11 and the first supporting substrate 31 together with the first adhesive layer 21 may be as follows. First, the first adhesive layer 21 is adhered to the surface of the first supporting substrate 31. As shown in FIG. 2, the first adhesive layer 21 is a whole adhesive layer covering the entire surface of the first supporting substrate 31. Next, the second surface 11B of the first substrate 11 is adhered to the first supporting substrate 31 with the first adhesive layer 21. Because the first adhesive layer 21 is a whole piece of adhesive layer, it will fully fill the gap (or referred to as "space") between the first substrate 11 and the first supporting substrate 31. The first adhesive layer 21 may be any adhesive layer as long as it can be utilized to bond the first substrate 11 and the first supporting substrate 31 together and can be removed by any proper process. Such adhesive layer may be formed of, for example, UV glue or releasable glue which can be removed by external force. In other embodiments, the first substrate 11 may be fixed on the first supporting substrate 31 by other method, such as by static electric adsorption. In this embodiment, the total thickness of the first supporting substrate 31 and the first substrate 11 is substantially less than 0.7 mm, but not limited thereto.

Figure 3:
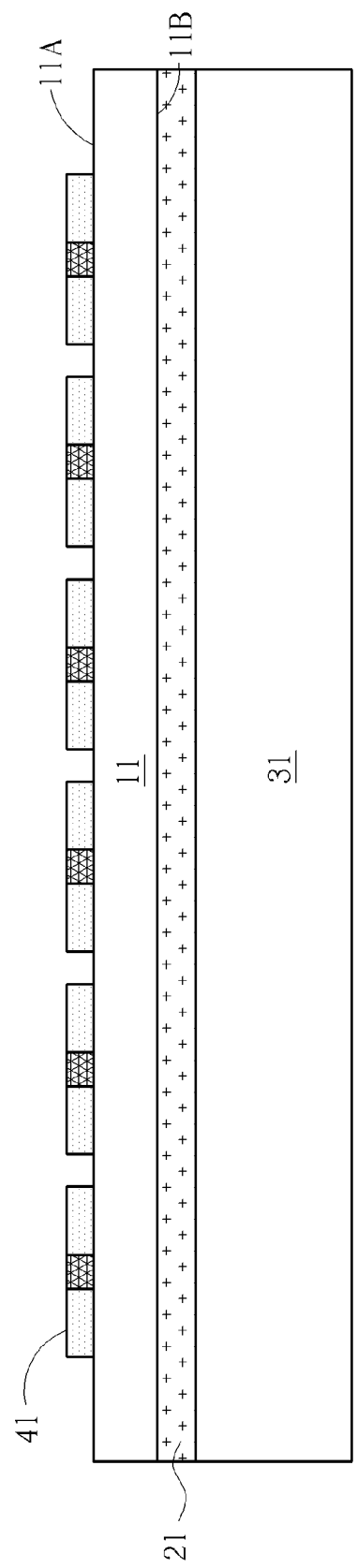

Thereafter, as shown in FIG. 3, a plurality of first devices 41 is formed on the first surface 11A of the first substrate 11. The first devices 41 may be devices needed by the display panel, such as color filter devices, light-shielding devices such as black matrixes, common electrodes, and the like, or other devices providing additional functions, for example, touch devices for providing touch function or 3D display devices, such as phase retarders, for providing 3D display function, but not limited thereto. For example, the first devices 41 may be touch devices or phase retarders. The touch device may be a capacitive touch device such as a singular layer of capacitive touch device or a multi-layer of capacitive touch device, resistive touch device or other type of touch device. In this embodiment, because the first adhesive layer 21 is a whole layer fully filling the space between the first substrate 11 and the first supporting substrate 31, i.e. no empty space remains between the first substrate 11 and the first supporting substrate 31, the first substrate 11 can be supported even and effectively without warping. Accordingly, the first devices 41 may be formed with precise alignment to improve a yield.

Figure 4:
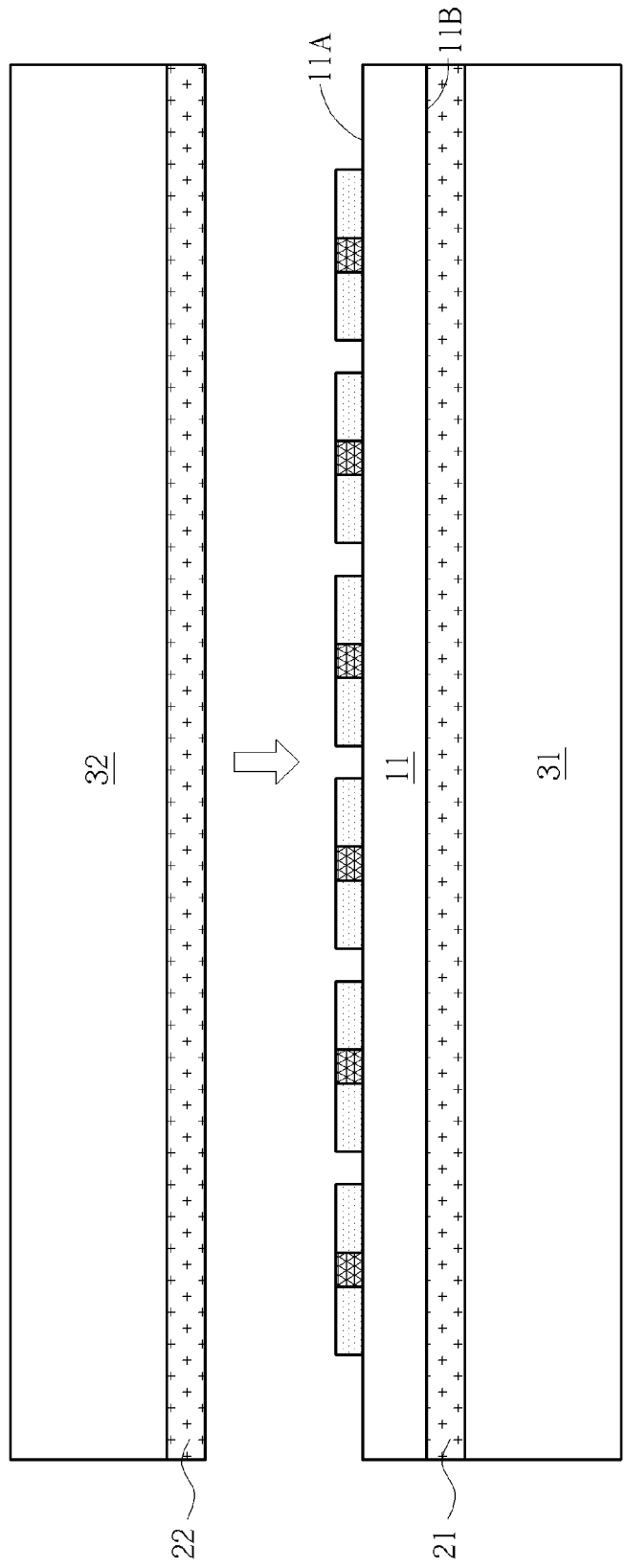
Figure 5:
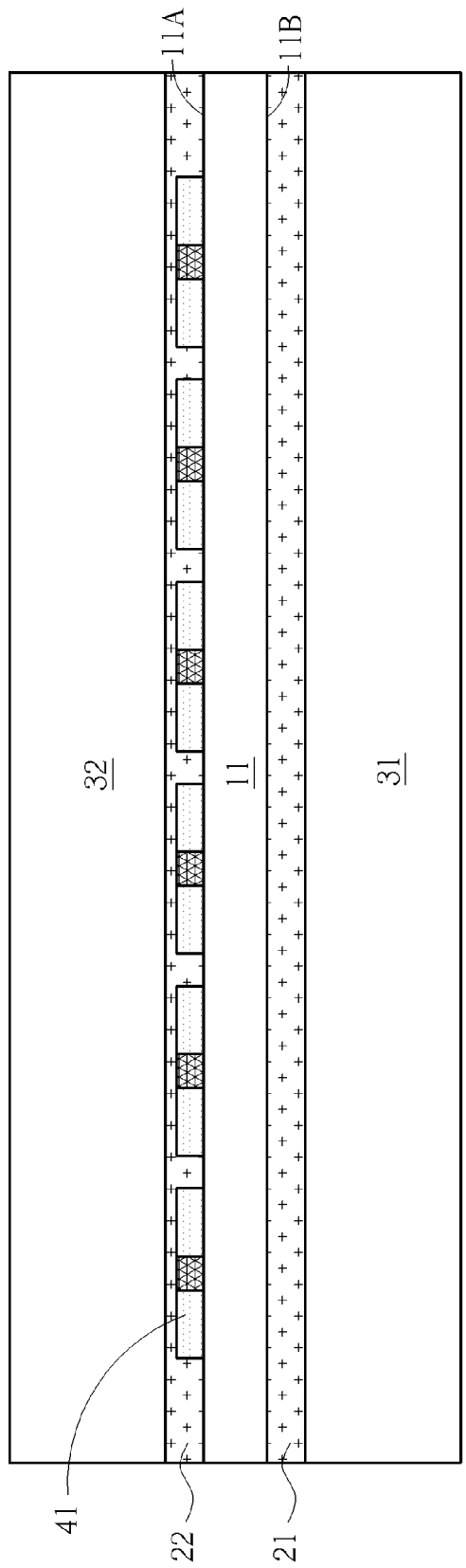

As shown in FIG. 4, thereafter, the second supporting substrate 32 is provided. The second adhesive layer 22 is formed on the second supporting substrate 32. As shown in FIG. 5, thereafter, the second supporting substrate 32 and the first substrate 11 are pressed together to allow the first surface 11A of the first substrate 11 to be adhered to the second supporting substrate 32 with the second adhesive layer 22. The second supporting substrate 32 supports the first substrate 11 during the fabricating process and provides functions of buffering and protection for preventing the first substrate 11 from being damaged or breaking or warping during moving. It is preferred that the thickness of the second supporting substrate 32 is greater than that of the first substrate 11. The thickness may be varied in accordance with different material. For example, the second supporting substrate 32 may be preferably a glass substrate and substantially has a thickness of 0.5 mm, but it is not limited thereto. It is preferred that the second adhesive layer 22 in this embodiment is a whole layer of an adhesive layer, and not just with a frame pattern as a sealant disposed on the peripheral portion of the second supporting substrate 32. The way to bond the first surface 11A of the first substrate 11 to the second supporting substrate 32 with the second adhesive layer 22 may be as follows, similar to the steps shown in FIG. 2. First, the second adhesive layer 22 is adhered to the surface of the second supporting substrate 32. Next, the first surface 11A of the first substrate 11 is adhered to the second supporting substrate 32 with the second adhesive layer 22. After the adhesion, the second adhesive layer 22 is located between the first surface 11A of the first substrate 11 and the second supporting substrate 32 and fully fills the space between any two adjacent first devices 41 so as to fully fill the space between the first substrate 11 and the second supporting substrate 32, i.e. no empty space remains between the first substrate 11 and the second supporting substrate 32. The second adhesive layer 22 may be any adhesive layer as long as it can be utilized to bond the first substrate 11 and the second supporting substrate 32 together and can be removed by any proper process. Such adhesive layer may be formed of, for example, UV glue or releasable glue which can be removed by external force. In other embodiments, the first substrate 11 may be fixed on the second supporting substrate 32 by other method, such as by static electric adsorption. In this embodiment, the total thickness of the second supporting substrate 32 and the first substrate 11 is substantially less than 0.7 mm, but not limited thereto.

Figure 6:
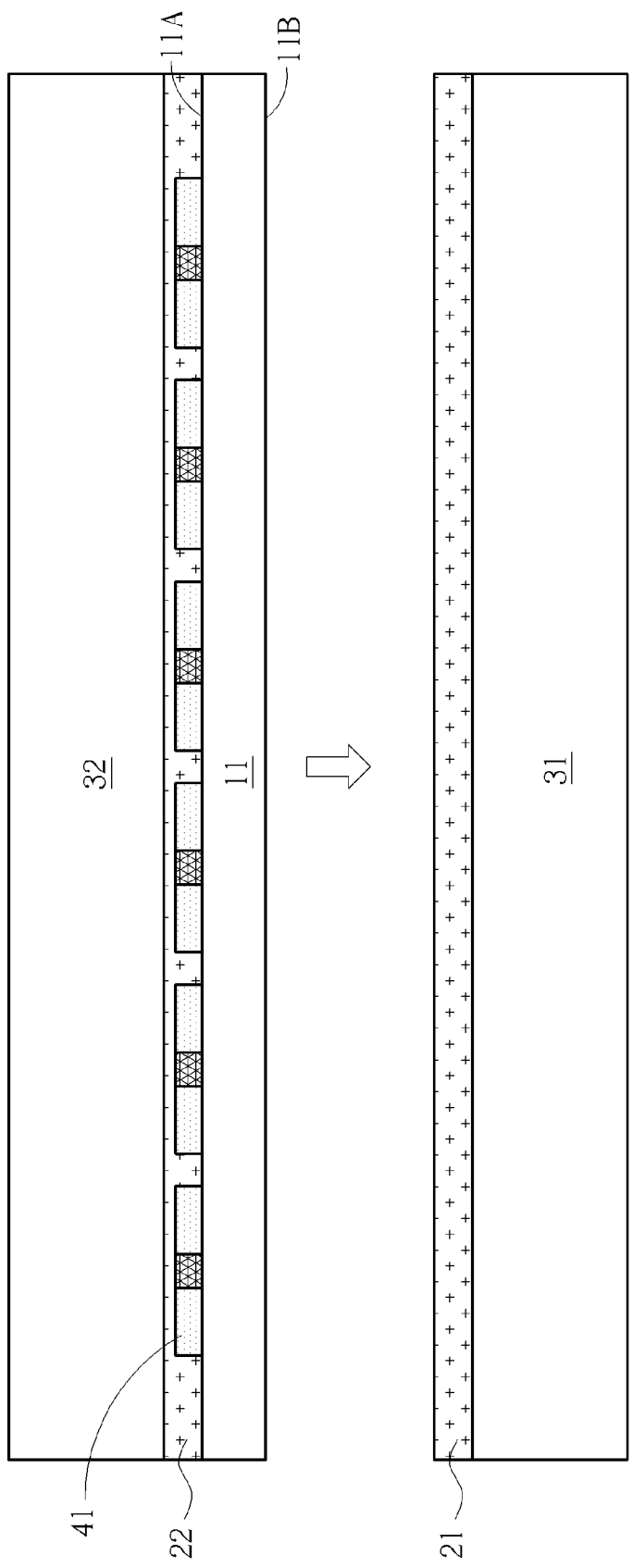

As shown in FIG. 6, the first adhesive layer 21 and the first supporting substrate 31 are separated from the second surface 11B of the first substrate 11. The steps for separation may be performed in varied process in accordance with the material of the first adhesive layer 21. For example, the first adhesive layer 21 and the first supporting substrate 31 can be simultaneously separated from the second surface 11B of the first substrate 11; or, the first supporting substrate 31 is separated from the first adhesive layer 21 in advance, and thereafter the first adhesive layer 21 is separated from the second surface 11B of the first substrate 11.

Figure 7:
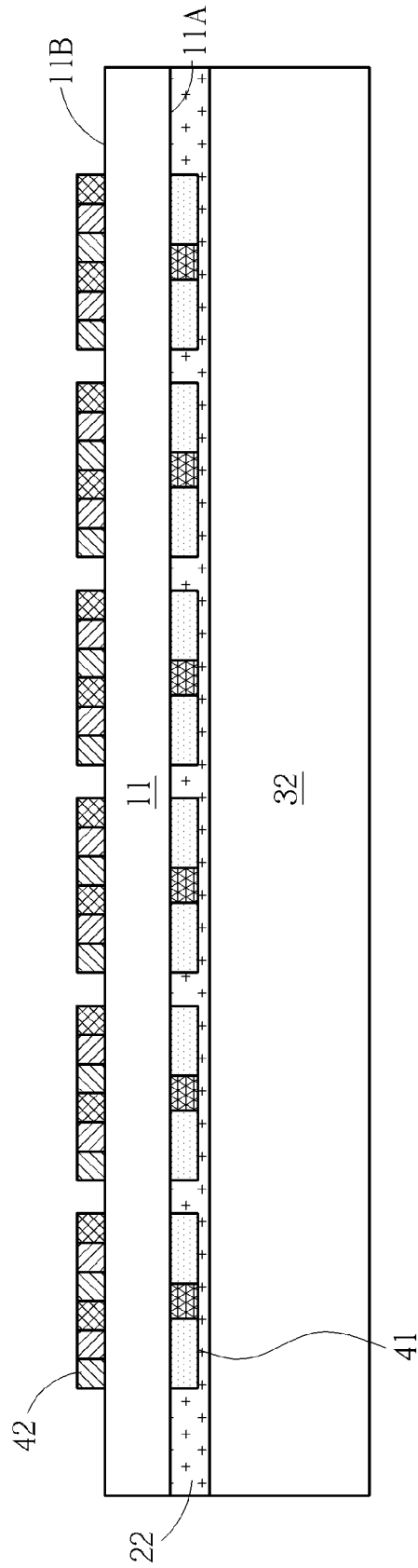

As shown in FIG. 7, a plurality of second devices 42 are formed on the second surface 11B of the first substrate 11. The second devices 42 may be devices required by the display panel, such as color filter devices, or other devices providing additional functions, for example, touch devices for providing touch function or phase retarders for providing 3D display function, but not limited thereto. The second devices 42 are different from the first devices 41. For example, if the first devices 41 are touch devices or phase retarders, the second devices 42 may be color filter devices and light-shielding devices, such as black matrixes, but not limited thereto. For example, if a vertically driven display panel is desired, the second devices 42 may further include common electrodes and other required elements; if a horizontally driven display panel is desired, the second devices 42 may not have to include common electrodes. In this embodiment, because the second adhesive layer 22 is a whole layer fully filling the space between the first substrate 11 and the second supporting substrate 32, i.e. there is no empty space remaining between the first substrate 11 and the second supporting substrate 32, the first substrate 11 can be supported even and effectively without warping. Accordingly, the second devices 42 may be formed with precise alignment to improve a yield.

Figure 8:
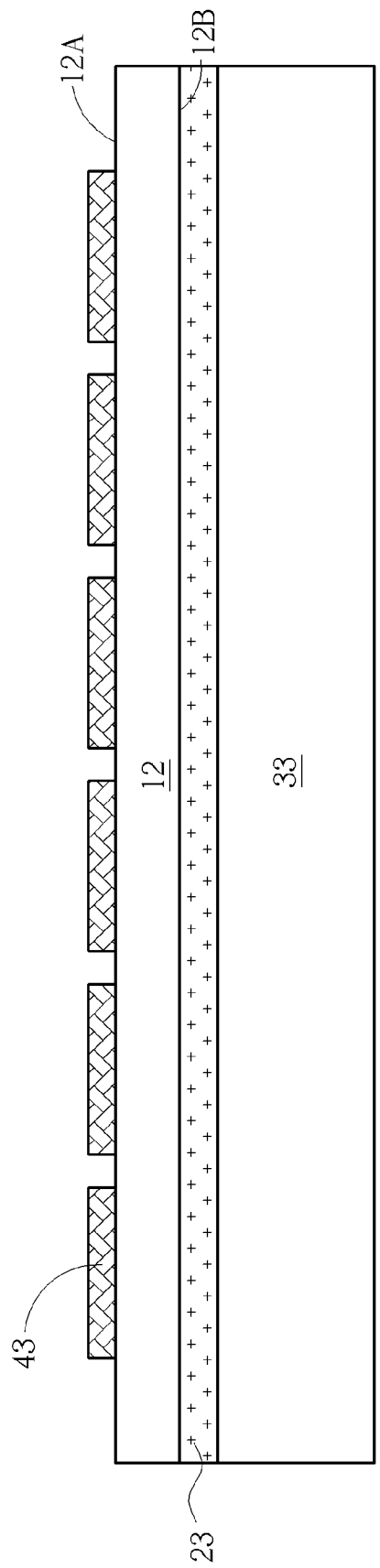

As shown in FIG. 8, the second substrate 12 is provided. The second substrate 12 has a third surface 12A and a fourth surface 12B opposing each other. Thereafter, the fourth surface 12B of the second substrate 12 is adhered to the third supporting substrate 33 with the third adhesive layer 23. The third supporting substrate 33 supports the second substrate 12 during the fabricating process and provides functions of buffering and protection for preventing the second substrate 12 from being damaged or breaking or warping during moving. It is preferred that the thickness of the third supporting substrate 33 is greater than that of the second substrate 12. The thickness may be varied in accordance with different material. For example, the third supporting substrate 33 may be preferably a glass substrate and substantially has a thickness of 0.5 mm, but it is not limited thereto. A plurality of third devices 43 is formed on the third surface 12A of the second substrate 12. The formation may be performed before or after the second substrate 12 is adhered to the third supporting substrate 33. The second substrate 12 is preferably a glass substrate and has a thickness of substantially in a range of from 0.05 mm to 0.2 mm, but is not limited thereto. Alternatively, the second substrate 12 may be a transparent or non-transparent substrate made of other materials. The thickness may be varied in accordance with the process limitations with respect to different materials. The second substrate 12 may be an array substrate (also referred to as "thin film transistor substrate (TFT substrate)"). The third devices 43 may be active devices such as TFT devices or other devices, such as common lines (also referred to as "storage capacitor lines"), common electrodes, pixel electrodes, liquid crystal capacitors, power lines, selection lines, storage capacitors, or other suitable devices. The functions and the layout of the aforesaid devices are well known to those skilled in the art and accordingly not described herein for conciseness. It is preferred that the third adhesive layer 23 in the embodiment is a whole layer of an adhesive layer, and not just with a frame pattern as a sealant disposed on the peripheral portion of the third supporting substrate 33. The way to bond the fourth surface 12B of the second substrate 12 to the third supporting substrate 33 with the third adhesive layer 23 may be as follows. As shown in FIG. 2, the third adhesive layer 23 is adhered to the surface of the third supporting substrate 33, and thereafter, the fourth surface 12B of the second substrate 12 is adhered to the third supporting substrate 33 with the third adhesive layer 23. After the adhesion, no empty space remains between the second substrate 12 and the third supporting substrate 33. The third adhesive layer 23 may be any adhesive layer as long as it can be utilized to bond the second substrate 12 and the third supporting substrate 33 together and can be removed by any suitable process. Such adhesive layer may be formed of, for example, UV glue or releasable glue which can be removed by external force. In other embodiments, the second substrate 12 may be fixed on the third supporting substrate 33 by other method, such as by static electric adsorption. In this embodiment, the total thickness of the third supporting substrate 33 and the second substrate 12 is substantially less than 0.7 mm, but not limited thereto.

Figure 9:
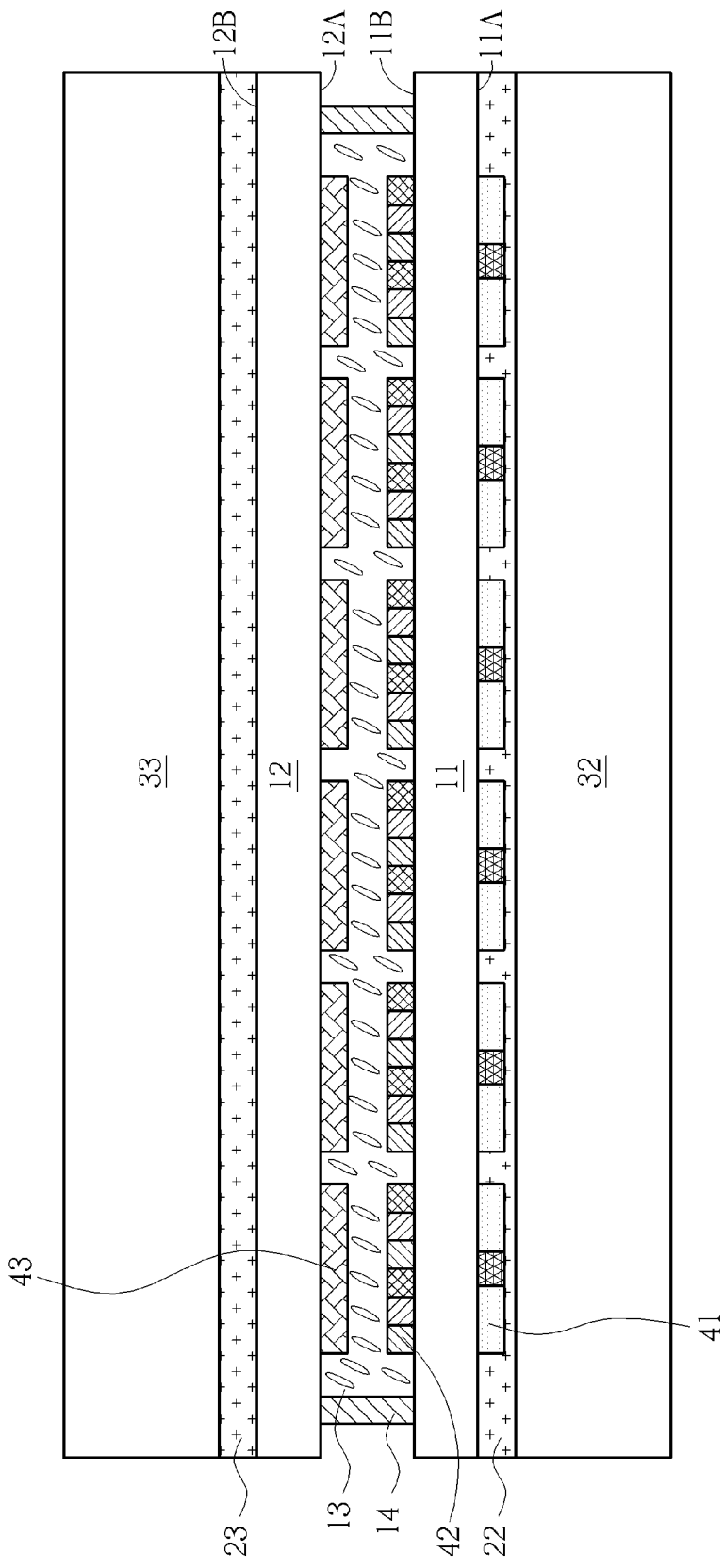

Thereafter, as shown in FIG. 9, the second surface 11B of the first substrate 11 is allowed to face the third surface 12A of the second substrate 12. The first substrate 11 and the second substrate 12 are assembled together, and a display medium layer 13 is formed between the first substrate 11 and the second substrate 12. The display medium layer 13 may be formed with non-self-luminescent display medium, such as liquid crystal material, electrowetting material, electrophoretic material, or other suitable material, or a combination of at least two of the aforesaid materials. Alternatively, the display medium layer 13 may be self-luminescent display medium, such as small-molecule organic luminescent material, polymeric organic luminescent material, inorganic luminescent material, or other suitable material, or a combination of at least two of the aforesaid materials. For example, the liquid crystal material, which is a non-self-luminescent display medium, is utilized in the embodiment. The first substrate 11 and the second substrate 12 may be bonded to each other, so as to be assembled together, with a sealant 14. The display medium layer 13 is sealed between the first substrate 11 and the second substrate 12 by the sealant 14.

Figure 10:
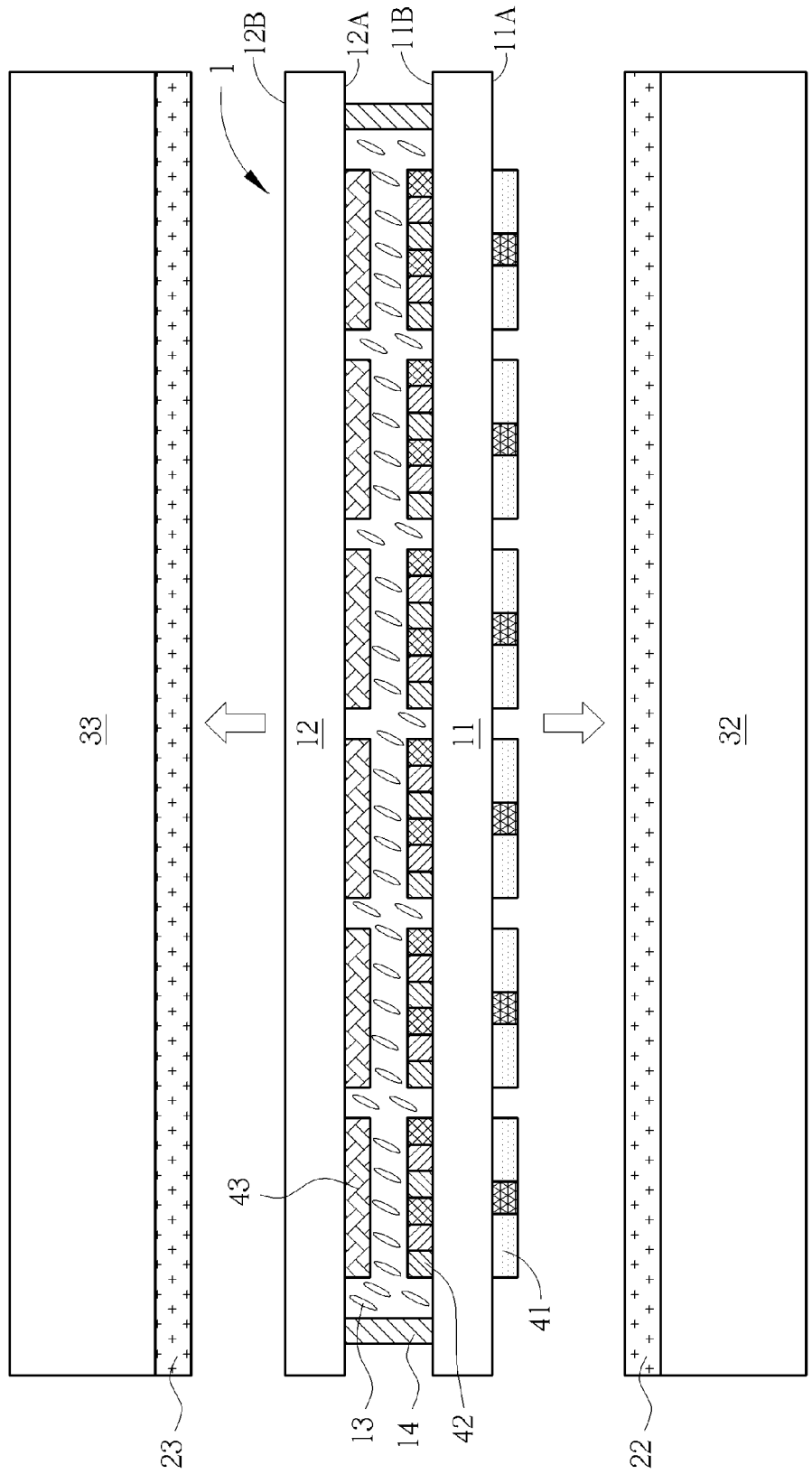

Thereafter, as shown in FIG. 10, the second adhesive layer 22 and the second supporting substrate 32 are separated from the first surface 11A of the first substrate 11, and the third adhesive layer 23 and the third supporting substrate 33 are separated from the fourth surface 12B of the second substrate 12, to form a display panel 1. The steps for separation may be similar to the separation of the first adhesive layer 21 and the first supporting substrate 31 from the first substrate 11, and accordingly are not described herein for conciseness. In addition, a cover substrate or a protection layer may be optionally formed on the first surface 11A of the first substrate 11 for protecting the devices 41. Furthermore, the first supporting substrate 31, the second supporting substrate 32, and the third supporting substrate 33 are reusable, and accordingly the fabrication cost can be saved.

In conclusion, in the method for fabricating a display panel according to the aforesaid disclosure, the substrates are supported and protected by the supporting substrates during the fabricating process, and, accordingly, a substrate has a relative small thickness, for example, in a range of from 0.05 mm to 0.2 mm, or less than 0.2 mm, can be utilized. Accordingly, the method according the disclosure can be used to fabricate a highly-transmissive thin type display panel.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for fabricating a display panel, comprising:
providing a first substrate having a first surface and a second surface opposing the first surface;
bonding the second surface of the first substrate to a first supporting substrate with a first adhesive layer;
forming a plurality of first devices on the first surface of the first substrate;
bonding the first surface of the first substrate to a second supporting substrate with a second adhesive layer;
separating the first adhesive layer and the first supporting substrate from the second surface of the first substrate;
forming a plurality of second devices on the second surface of the first substrate;
providing a second substrate having a third surface and a fourth surface opposing the third surface;
bonding the fourth surface of the second substrate to a third supporting substrate with a third adhesive layer;
assembling the first substrate and the second substrate and forming a display medium layer between the first substrate and the second substrate, wherein the second surface of the first substrate faces the third surface of the second substrate; and
separating the second adhesive layer and the second supporting substrate from the first surface of the first substrate and separating the third adhesive layer and the third supporting substrate from the fourth surface of the second substrate.

2. The method for fabricating the display panel according to claim 1, wherein bonding the first surface of the first substrate to the second supporting substrate with the second adhesive layer comprises steps of:
forming the second adhesive layer on the second supporting substrate; and
pressing the second supporting substrate and the first substrate onto each other to allow the second adhesive layer to bond the first surface of the first substrate and the second supporting substrate together;
wherein, the second adhesive layer is located between the first surface of the first substrate and the second supporting substrate and fully fills a space between any adjacent two of the first devices and a space between the first substrate and the second supporting substrate.

3. The method for fabricating the display panel according to claim 1, wherein, a thickness of the first substrate is substantially in a range of from 0.05 millimeters to 0.2 millimeters, and a thickness of the second substrate is substantially in a range of from 0.05 millimeters to 0.2 millimeters.

4. The method for fabricating the display panel according to claim 1, wherein, a total thickness of the first supporting substrate and the first substrate is substantially less than 0.7 millimeters, a total thickness of the second supporting substrate and the first substrate is substantially less than 0.7 millimeters, and a total thickness of the second supporting substrate and the second substrate is substantially less than 0.7 millimeters.

5. The method for fabricating the display panel according to claim 1, wherein the first substrate and the second substrate independently comprise a glass substrate.

6. The method for fabricating the display panel according to claim 1, wherein the first devices comprise a plurality of touch sensors.

7. The method for fabricating the display panel according to claim 1, wherein the first devices comprise a plurality of phase retarders.

8. The method for fabricating the display panel according to claim 1, wherein the second devices comprise a plurality of color filter devices.

9. The method for fabricating the display panel according to claim 1, further comprising forming a plurality of third devices on the third surface of the second substrate.

10. The method for fabricating the display panel according to claim 9, wherein the third devices comprise a plurality of active devices.

11. The method for fabricating the display panel according to claim 1, wherein assembling the first substrate and the second substrate is performed using a sealant.

12. The method for fabricating the display panel according to claim 1, wherein the display medium layer comprises a liquid crystal layer.

* * * * *